(12) United States Patent
Prater

(10) Patent No.: US 9,402,507 B1
(45) Date of Patent: Aug. 2, 2016

(54) EASY GRILLING SKEWER PREPARATION SYSTEM

(71) Applicant: Josh Prater, Sparks, NV (US)

(72) Inventor: Josh Prater, Sparks, NV (US)

( * ) Notice: Subject to any disclaimer, the term of this patent is extended or adjusted under 35 U.S.C. 154(b) by 134 days.

(21) Appl. No.: 14/276,852

(22) Filed: May 13, 2014

Related U.S. Application Data

(60) Provisional application No. 61/824,841, filed on May 17, 2013.

(51) Int. Cl.
*B42F 13/12* (2006.01)
*A47J 37/06* (2006.01)
*A47J 37/07* (2006.01)
*A23L 1/01* (2006.01)

(52) U.S. Cl.
CPC ........... *A47J 37/0694* (2013.01); *A23L 1/0128* (2013.01); *A47J 37/0786* (2013.01)

(58) Field of Classification Search
CPC ... A47J 37/0694; A47J 31/0786; A47J 37/06; A47J 37/04; A23L 1/0128; A23L 1/01; A47F 5/005; A47F 7/144; A47F 5/132; A47F 3/14; A47F 10/06; A22C 17/006; B42F 13/12; A01F 25/12; A47B 57/58; A47B 96/04; A47B 88/20; A47B 2088/202; A47B 2088/205
USPC ....................... 211/125, 153, 175, 184, 126.1; 99/421 H, 419, 421 A, 421 HH, 421 HV
See application file for complete search history.

(56) References Cited

U.S. PATENT DOCUMENTS

| | | | | |
|---|---|---|---|---|
| 1,428,872 A | * | 9/1922 | Anderson | A23G 3/24 118/503 |
| 1,436,560 A | * | 11/1922 | Anderson | A23G 3/24 118/31 |
| 1,560,179 A | * | 11/1925 | Lubben | A01F 25/12 211/125 |
| 2,815,706 A | | 6/1955 | Weinberger | |
| 3,169,470 A | | 2/1965 | Oatley | |
| 3,297,166 A | * | 1/1967 | Summers | A47J 37/0694 211/60.1 |
| 3,750,894 A | * | 8/1973 | Jensen | A47F 5/005 211/184 |
| 3,858,495 A | * | 1/1975 | Gotwalt | A47J 37/0694 99/421 A |
| 4,553,523 A | * | 11/1985 | Stohrer, Jr. | A47J 37/0694 126/152 B |
| 4,583,263 A | | 4/1986 | Wigley, Jr. | |

(Continued)

*Primary Examiner* — Jennifer E Novosad
(74) *Attorney, Agent, or Firm* — RG Patent Consulting, LLC; Rachel Gilboy

(57) ABSTRACT

An apparatus having a skewer preparation tray with individual cube sections for placing food items and an easy process of securing the food items to a skewer enabling a user to simultaneously safely prepare several skewers for grilling with minimal waste through dropping food-items and eliminating the dripping of marinade. The cube sections are created via coupling a plurality of horizontal-dividers with a plurality of vertical-dividers.

17 Claims, 5 Drawing Sheets

(56) References Cited

U.S. PATENT DOCUMENTS

| | | | | |
|---|---|---|---|---|
| 5,775,523 A * | 7/1998 | Teringo | A47F 5/005 | 211/11 |
| 5,782,224 A * | 7/1998 | Rabell | A47J 37/049 | 126/25 R |
| 5,887,513 A * | 3/1999 | Fielding | A47J 37/0694 | 99/419 |
| 5,996,820 A * | 12/1999 | Broadnax | A22C 15/007 | 211/125 |
| 6,044,989 A * | 4/2000 | Sosso | A47F 5/005 | 211/184 |
| 6,058,925 A * | 5/2000 | Patterson | A47J 37/0694 | 126/25 A |
| 6,474,224 B1 * | 11/2002 | Natter | A47J 37/0694 | 99/419 |
| 6,845,871 B1 * | 1/2005 | Culp | A47B 47/042 | 211/184 |
| 8,627,764 B1 * | 1/2014 | Cloutier | A47J 37/0694 | 99/448 |
| 2003/0034319 A1 * | 2/2003 | Meherin | A47F 5/005 | 211/184 |
| 2005/0072785 A1 * | 4/2005 | Cheng | A47B 88/20 | 220/528 |
| 2006/0124567 A1 * | 6/2006 | Bove | A47J 43/18 | 211/125 |
| 2009/0311400 A1 * | 12/2009 | Allen | A47J 37/049 | 426/523 |
| 2011/0223296 A1 * | 9/2011 | Bryce | A23G 3/54 | 426/274 |
| 2013/0248475 A1 * | 9/2013 | Erickson | A47F 5/005 | 211/119.003 |
| 2015/0164276 A1 * | 6/2015 | Crow | A47J 37/0694 | 99/444 |

* cited by examiner

EASY GRILLING SKEWER PREPARATION SYSTEM

CROSS-REFERENCE TO RELATED APPLICATION

The present application is related to and claims priority from prior provisional application Ser. No. 61/824,841, filed May 13, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of cooking implements and more specifically relates to an easy grilling skewer preparation system.

2. Description of the Related Art

The term Shish kebab is a Turkish word meaning "skewer". It refers to threading meat on a skewer and grilling the meat on an outdoor grill. Virtually any kind of meat may be used and cubes of fruit or vegetables are often threaded onto the spit as well. Typical vegetables desired by many cooks include tomatoes, bell peppers, onions, and mushrooms.

When outdoor cooks decide to grill food via a skewer process they normally are required to hold a skewer in one hand and thread the meat pieces and vegetable pieces onto the skewer one food item at a time. This is a time consuming, and an often frustrating experience as it is easy to drop slippery food items, thus wasting the meat, vegetables, or fruit. The food items being grilled are often soaked in a marinade. While placing food items on a skewer, the marinade can easily drip onto a preparation table, the floor, or the ground creating a mess and slippery conditions under foot.

An added undesirability in using the typical skewer occurs when the user accidently pricks fingers while trying to place the food items on the sharp tip of a skewer. Even with an apparatus comprising multiple skewers, the possibilities of pricking fingers and of dropping and wasting food applies since the food items are still threaded onto a skewer one food item at a time and one skewer at a time.

Various attempts have been made to solve the above-mentioned problems such as those found in U.S. Pat. No. 6,474,224 to Seth Natter, U.S. Pat. No. 2,815,706 to Harold Weinberger, U.S. Pat. No. 3,297,166 to Bernadette Summers, U.S. Pat. No. 5,887,513 to Charles S. Adams, et al., U.S. Pat. No. 4,583,263 to Thomas W. Wigley, Jr, and U.S. Pat. No. 3,169,470 to Frederick Oatley Arther. This art is representative of cooking implements. None of the above inventions and patents, taken either singly or in combination, is seen to describe the invention as claimed.

Ideally, an easy grilling skewer preparation system should provide a user with the ability to place food items on a plurality of skewers while minimizing the waste of dropping slippery food items, and limiting the possibility of pricking fingers while threading food items on the sharp tip of a skewer and, yet would operate reliably and be manufactured at a modest expense. Thus, a need exists for a reliable easy grilling skewer preparation system to avoid the above-mentioned problems.

BRIEF SUMMARY OF THE INVENTION

In view of the foregoing disadvantages inherent in the known cooking implement art, the present invention provides a novel easy grilling skewer preparation system. The general purpose of the present invention, which will be described subsequently in greater detail is to provide a skewer preparation tray with a bottom surface for collecting drippings of marinade, having individual cube sections for placing food items, and an easy process of securing the food items onto a skewer thus enabling a user to simultaneously prepare several skewers for grilling without pricking fingers or having a mess through dripping marinade and minimizing food waste.

An easy grilling skewer preparation system is disclosed, in a preferred embodiment, comprising: a skewer-preparation-assembly and a plurality of skewers. The skewer-preparation-assembly comprises in combination a preparation-tray having a bottom-surface, a first-side, a second-side, a third-side, and a fourth-side, a plurality of horizontal-dividers, each of the horizontal-dividers having a horizontal-first-end, a horizontal-second-end, and a plurality of horizontal-divider-intersection-slots, and a plurality of vertical-dividers, each of the vertical-dividers having a vertical-first-end, a vertical-second-end, and a plurality of vertical-divider-intersection-slots.

The first-side, second-side, third-side, and fourth-side of the preparation-tray are molded together in the shape of a rectangle and are fixedly attached via molding to the outer-edges of the bottom-surface of the preparation-tray. The preparation-tray having a rectangular shape is comprised of machine washable plastic material approximately 15 inches long, approximately 9 inches wide and approximately 1½ inches deep able to contain a plurality of skewers holding food-items.

The first-side and the third-side each comprise a plurality of skewer-slots. Each of the plurality of skewer-slots on the first-side and the third-side extend approximately ¾ inch from a top-edge of the first-side and the top-edge of the third-side enabling each of the plurality of skewers to rest at a mid-point on the first-side and the mid-point of the third-side.

Each of the plurality of horizontal-dividers comprises a plurality of skewer-slots enabling skewers to pass through the horizontal-dividers and a support-tab on the horizontal-first-end and the horizontal-second-end. Each of the support-tabs on the horizontal-first-ends rest on the top-edge of the second-side and each of the support-tabs on the horizontal-second-end rest on the top-edge of the fourth-side. The support-tabs, when positioned, provide stability for each of the horizontal-dividers positioned on the preparation-tray.

Each of the plurality of horizontal-dividers further comprises a plurality of horizontal-divider-intersection-slots having a length of approximately ¾ inch extending from the top-edge of each of the horizontal-dividers. The plurality of horizontal-divider-intersection-slots on each of the horizontal-dividers are useful for coupling with the plurality of vertical-divider-intersection-slots on each of the plurality of vertical-dividers.

Each of the plurality of vertical-dividers comprises support-tabs on the vertical-first-end and the vertical-second-end. Each of the support-tabs on the vertical-first-end rest on the top-edge of the first-side and each of the support-tabs on the vertical-second-end rest on the top-edge of the third-side. The support-tabs provide stability for each of the vertical-dividers on the preparation-tray.

Each of the vertical-dividers further comprises a plurality of vertical-divider-intersection-slots extending from the bottom-edge of each of the vertical-dividers. Each of the plurality of vertical-divider-intersection-slots on the plurality of vertical-dividers comprise a length of approximately ¾ inch extending from the bottom-edge of each of the plurality of vertical-dividers and are useful for coupling with the plurality of horizontal-divider-intersection-slots on the plurality of horizontal-dividers. The coupling of each of the vertical-dividers and each of the horizontal-dividers creates a plurality of food-item-cubes.

Each of the horizontal-dividers and each of the vertical-dividers are able to be placed into the preparation-tray via coupling their respective intersection-slots creating the plurality of food-item-cubes. Each of the food-item-cubes is able to hold a food-item. Each of the food-item-cubes preferably comprises a length, a width, and a depth of approximately 1½ inches with each of the food-item-cubes able to hold one food-item. A user may fill as many food-item-cubes in a row as desired prior to using one or several skewers for grilling.

Each of the plurality of skewers, having a ringed-handle able to be gripped by a user to handle each of the plurality of skewers, and a sharp tip able to penetrate through the food-items, is of sufficient length to enter each of the plurality of skewer-slots on the first-side, then through each of the food-items in a row, and then through each of the respective plurality of skewer-slots on the third-side.

When ready for use, a user is able to assemble the skewer-preparation-assembly via coupling each of the horizontal-dividers and each of the vertical-dividers via their respective intersection slots and place the now-joined horizontal-dividers and vertical-dividers into the preparation-tray using the support-tabs on the vertical-first-end, the support-tabs on the vertical-second-end, the support-tabs on the horizontal-first-end, and the support-tabs on the horizontal-second-end for stabilization respectively on the top-edge of the first-side, second-side, third-side, and fourth-size. Each of the support-tabs rest on the top-edge of the respective side of the preparation-tray.

The user is then able to place the food-items, comprising pieces of meat cut to size, into the food-item-cubes, and insert each of the plurality of skewers through the respective skewer-slots on the first-side, through each of the food-items, through each of the skewer-slots on the horizontal-dividers, and then through each of the opposing skewer-slots on the third-side. When the skewers containing food-items are prepared for grilling, the user is able to remove each of the plurality of skewers from the preparation-tray by gripping each of the ringed-handles on the skewers and lifting each of the skewers up and out of the preparation-tray, and place each of the plurality of skewers containing the food-items on a grill for cooking.

The present invention holds significant improvements and serves as an easy grilling skewer preparation system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, an easy grilling skewer preparation system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a cooking implement and more particularly to an easy grilling skewer preparation system as used to improve the efficiency of preparing shish kebabs on a plurality of skewers and placing the skewers of shish kebabs on a grill for cooking.

Generally speaking, the easy grilling skewer preparation system allows a user to prepare a number of shish kebabs in a preparation tray comprising a plurality of horizontal and vertical dividers that create a plurality of cubes. Individual food items for the shish kebabs are placed in the cubes and a user is able to insert a skewer into the preparation tray and through the foods items in a row of cubes and skewer-slots on each of a plurality of horizontal-dividers, and then easily remove the skewer with the food-items from the preparation tray and place it on a grill for cooking.

Figure 1:
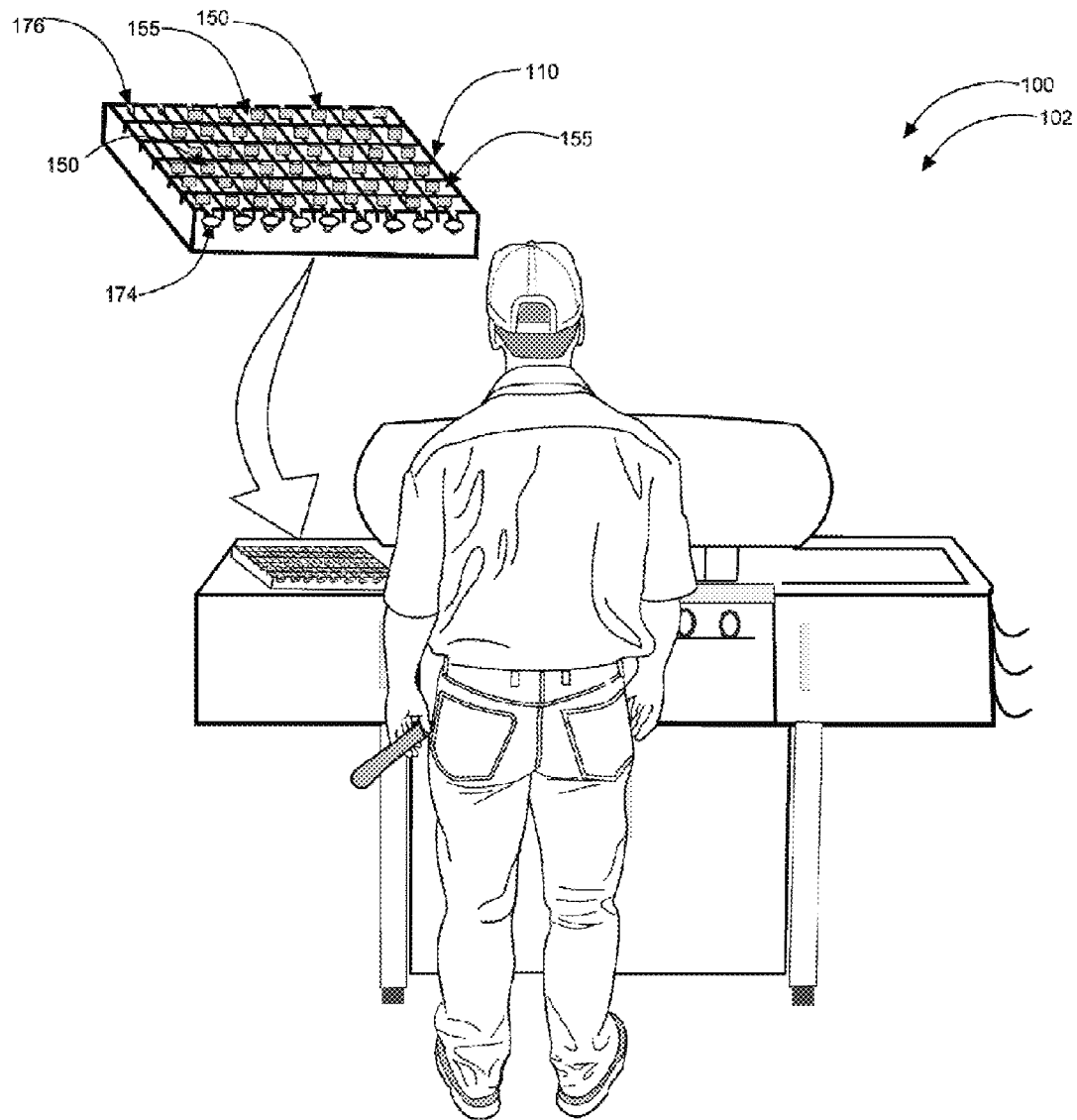
FIG. 1 shows a perspective view illustrating an easy grilling skewer preparation system in an in-use condition according to an embodiment of the present invention.

Referring to the drawings by numerals of reference there is shown in FIG. 1, a perspective view illustrating easy grilling skewer preparation system 100 in an in-use condition 102 according to an embodiment of the present invention.

Easy grilling skewer preparation system 100 comprises: skewer-preparation-assembly 110 and plurality of skewers 170. Skewer-preparation-assembly 110 comprises in combination preparation-tray 120 having bottom-surface 122, first-side 124, second-side 126, third-side 128, and fourth-side 129, plurality of horizontal-dividers 130, each of horizontal-dividers 130 having horizontal-first-end 132, horizontal-second-end 134, plurality of skew-slots 172, and plurality of horizontal-divider-intersection-slots 136, and plurality of vertical-dividers 140, each of vertical-dividers 140 having vertical-first-end 142, vertical-second-end 144, and plurality of vertical-divider-intersection-slots 145.

When ready for use, a user is able to assemble skewer-preparation-assembly 110 via coupling each of horizontal-dividers 130 and each of vertical-dividers 140 via their respective divider-intersection-slots 136 and place the 'now-joined' horizontal-dividers 130 and vertical-dividers 140 into preparation-tray 120 using support-tabs 146 on vertical-first-end 142, support-tabs 146 on vertical-second-end 144, support-tabs 146 on horizontal-first-end 132, and support-tabs 146 on horizontal-second-end 134 for stabilization respectively on top-edge 125 of first-side 124, second-side 126, third-side 128, and fourth-side 129. Each of support-tabs 146 rest on top-edge 125 of the respective side of preparation-tray 120.

The user is then able to place food-items 150, comprising pieces of meat cut to size, into food-item-cubes 155, and insert each of plurality of skewers 170 through respective skewer-slots 172 on first-side 124, through each of food-items 150, through each of skewer-slots 172 on horizontal-dividers 130, and then through each of the opposing skewer-slots 172 on third-side 128. In an alternate embodiment, food-items 150 comprise vegetables cut to size to fit within food-item-cubes 155. In yet another embodiment, food-items 150 comprise pieces of fruit cut to size to fit within food-item-cubes 155. With this flexibility of food-items 150, the user is able to select any desired food-items 150 to use on the skewers 170 being prepared for grilling.

When skewers 170 containing food-items 150 are ready for grilling, the user is able to remove each of plurality of skewers 170 from preparation-tray 120 by gripping each of ringed-handles 174 on skewers 170 and lifting each of skewers 170 up and out of preparation-tray 120, and place each of plurality of skewers 170 containing food-items 150 on a grill for cooking.

Figure 2:
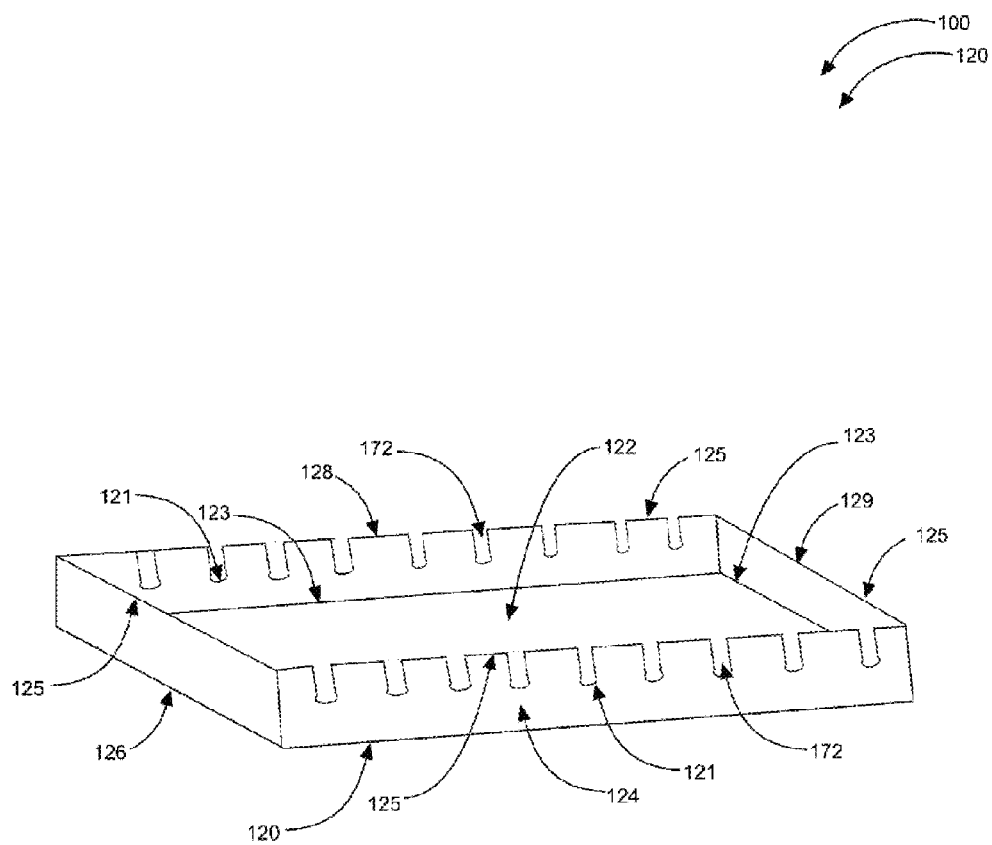
FIG. 2 is a perspective view illustrating an easy grilling skewer assembly preparation tray according to an embodiment of the present invention of FIG. 1.

Referring now to FIG. 2, a perspective view illustrating easy grilling skewer assembly 110 preparation tray 120 according to an embodiment of the present invention of FIG. 1.

First-side 124, second-side 126, third-side 128, and fourth-side 129 of preparation-tray 120 are molded together forming a rectangle, and are fixedly attached via molding to outer-edges 123 of bottom-surface 122 of preparation-tray 120. Preparation-tray 120 having a rectangular shape comprised of machine washable plastic material preferably measures approximately 15 inches long, approximately 9 inches wide and approximately 1½ inches deep, able to contain a plurality of skewers 170 holding food-items 150. In alternate embodiments preparation-tray 120 may be constructed of any machine washable material or non-machine washable material. Smaller preparation-trays 120 using fewer skewers 170 and larger preparation-trays 120 allowing for more skewers 170 may also be used in alternate embodiments.

First-side 124 and third-side 128 each comprise plurality of skewer-slots 172. Each of plurality of skewer-slots 172 on first-side 124 and third-side 128 extend approximately ¾ inch down from top-edge 125 of first-side 124 and top-edge 125 of third-side 128 enabling each of plurality of skewers 170 to rest at mid-point 121 on first-side 124 and mid-point 121 of third-side 128.

Since the design of preparation-tray 120 comprises bottom-surface 122, food-items 150 and marinade on food-items 150 is collected on bottom-surface 122 to avoid waste and messy conditions.

Figure 3A:
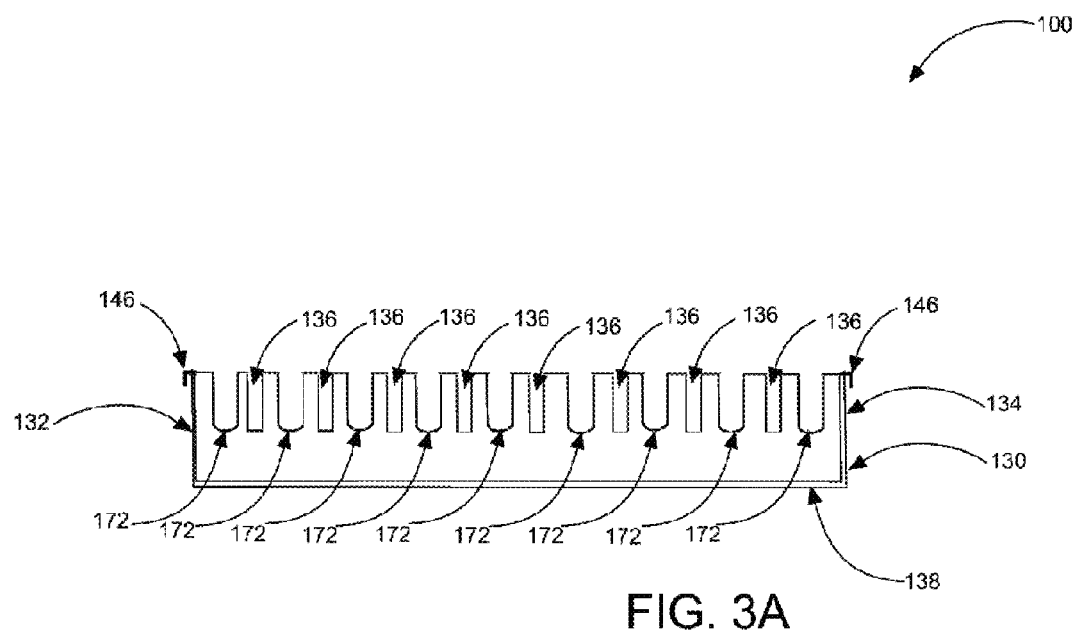
FIG. 3A is a perspective view illustrating a horizontal-divider according to an embodiment of the present invention of FIG. 1.

Referring now to FIG. 3A a perspective view illustrating horizontal-divider 130 according to an embodiment of the present invention of FIG. 1.

Each of plurality of horizontal-dividers 130 comprises plurality of skewer-slots 172 extending approximate ¾ inch from top-edge 125 of horizontal-dividers 130 enabling skewers 170 to pass through horizontal-dividers 130, support-tab 146 on horizontal-first-end 132 and horizontal-second-end 134. Each of support-tabs 146 on horizontal-first-ends 132 rest on top-edge 125 of second-side 126 and each of support-tabs 146 on horizontal-second-end 134 rest on top-edge 125 of fourth-side 129. Support-tabs 146, when positioned, provide stability for each of horizontal-dividers 130 positioned on preparation-tray 120.

Each of plurality of horizontal-dividers 130 further comprises plurality of horizontal-divider-intersection-slots 136 having a length of approximately ¾ inch extending from top-edge 125 of each of horizontal-dividers 130. Plurality of horizontal-divider-intersection-slots 136 on each of horizontal-dividers 136 are useful for coupling with plurality of vertical-divider-intersection-slots 145 on each of plurality of vertical-dividers 140.

Figure 3B:
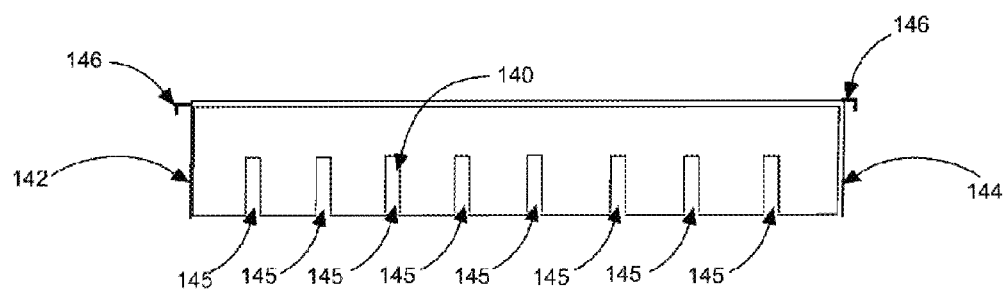
FIG. 3B is a perspective view illustrating a vertical-divider according to an embodiment of the present invention of FIG. 1.

Referring now to FIG. 3B a perspective view illustrating vertical-divider 140 according to an embodiment of the present invention of FIG. 1.

Each of plurality of vertical-dividers 140 comprises support-tabs 136 on vertical-first-end 142 and vertical-second-end 144. Each of support-tabs 136 on vertical-first-end 142 rest on top-edge 125 of first-side 124 and each of support-tabs 136 on vertical-second-end 144 rest on top-edge 125 of third-side 128. Support-tabs 136 provide stability for each of vertical-dividers 140 on the preparation-tray 120.

Each of vertical-dividers 140 further comprises plurality of vertical-divider-intersection-slots 145 extending approximately ¾ inch from bottom-edge 138 of each of vertical-dividers 140 and are useful for coupling with plurality of horizontal-divider-intersection-slots 136 on plurality of horizontal-dividers 130. The coupling of each of vertical-dividers 140 and each of horizontal-dividers 130 creates plurality of food-item-cubes 155.

Figure 4:
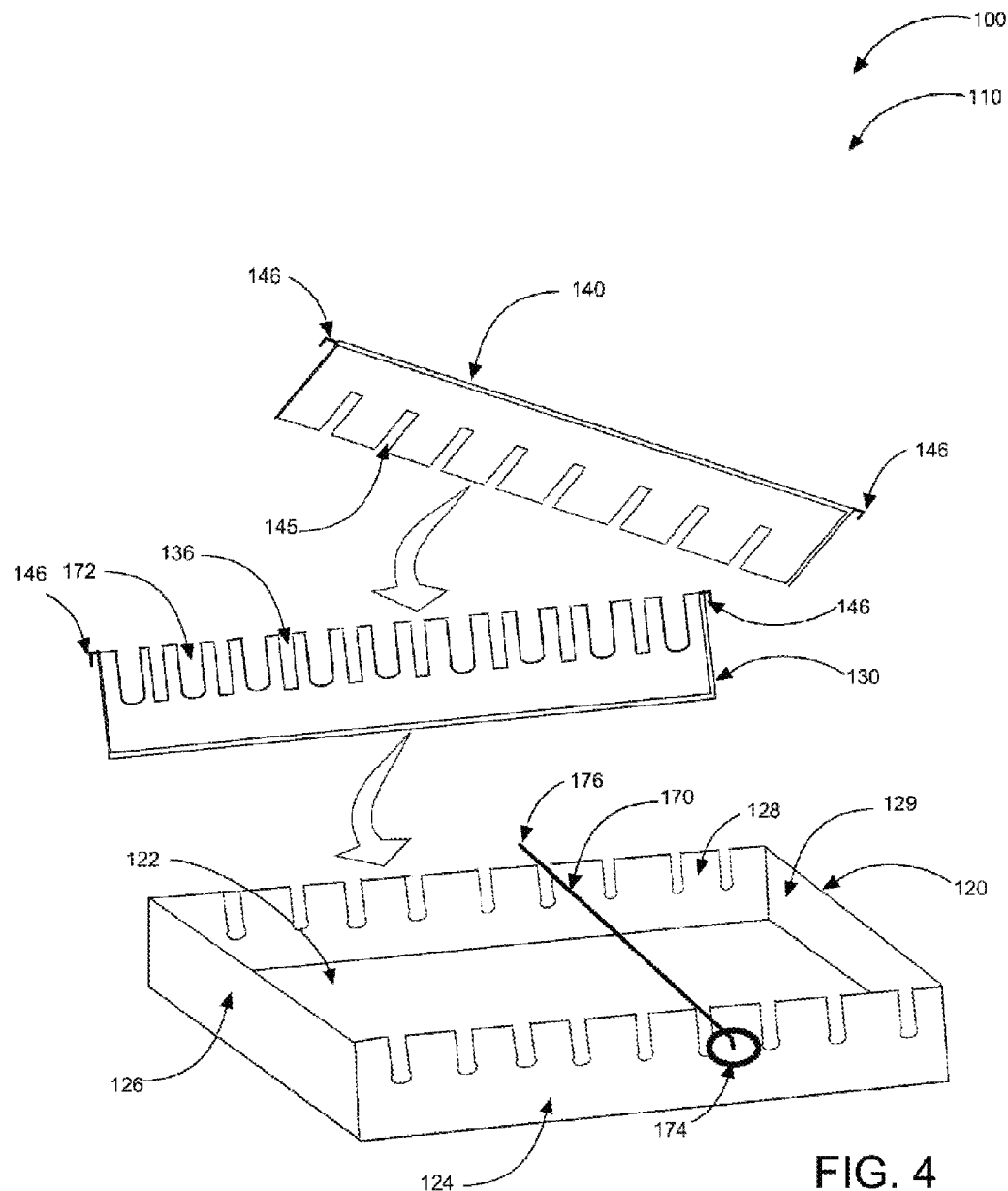
FIG. 4 is a perspective view illustrating an assembled easy grilling skewer preparation system ready for assembly according to an embodiment of the present invention of FIG. 1.

Referring now to FIG. 4 a perspective view illustrating an easy grilling skewer preparation system 100 ready for assembly according to an embodiment of the present invention of FIG. 1.

Each of horizontal-dividers 130 and each of vertical-dividers 140 are able to be placed into preparation-tray 120 via coupling each of horizontal-divider-intersection-slots 136 on horizontal-dividers 130 with each of vertical-divider-intersection-slots 145 on vertical-dividers 140 creating plurality of food-item-cubes 155. Each of food-item-cubes 155 is able to hold food-item 150. Each of food-item-cubes 155 comprises a length, a width, and a depth of approximately 1½ inches with each of food-item-cubes 155 able to hold one food-item 150. A user may fill as many food-item-cubes 155 in a row as desired prior to using one or several skewers 170 for grilling.

Each of plurality of skewers 170, having a ringed-handle 174 is able to be gripped by a user to handle each of plurality of skewers 170 and sharp tip 176 able to penetrate through food-items 155. Each of plurality of skewers 170 is of sufficient length to enter each of plurality of skewer-slots 172 on first-side 124, then through each of food-items 155, and then through each of the respective plurality of skewer-slots 172 on each of horizontal-dividers 130, and through skewer-slots 172 on third-side 128. Since plurality of skewers 170 are inserted into preparation-tray 120, the user is able to minimize any accidental pricking of fingers during the threading process.

Easy grilling skewer preparation system 100 according to an embodiment of the present invention of FIGS. 1-4 may be sold as kit comprising the following parts: at least one preparation-tray 120 having bottom-surface 122, first-side 124, second-side 126, third-side 128, and fourth-side 129; plurality of horizontal-dividers 130; plurality of vertical-dividers 140; plurality of skewers 170; and at least one set of user instructions. The kit has instructions such that functional relationships are detailed in relation to the structure of the invention (such that the invention can be used, maintained, or the like in a preferred manner). Easy grilling skewer preparation system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different tray combinations, parts may be sold separately, etc., may be sufficient.

Figure 5:
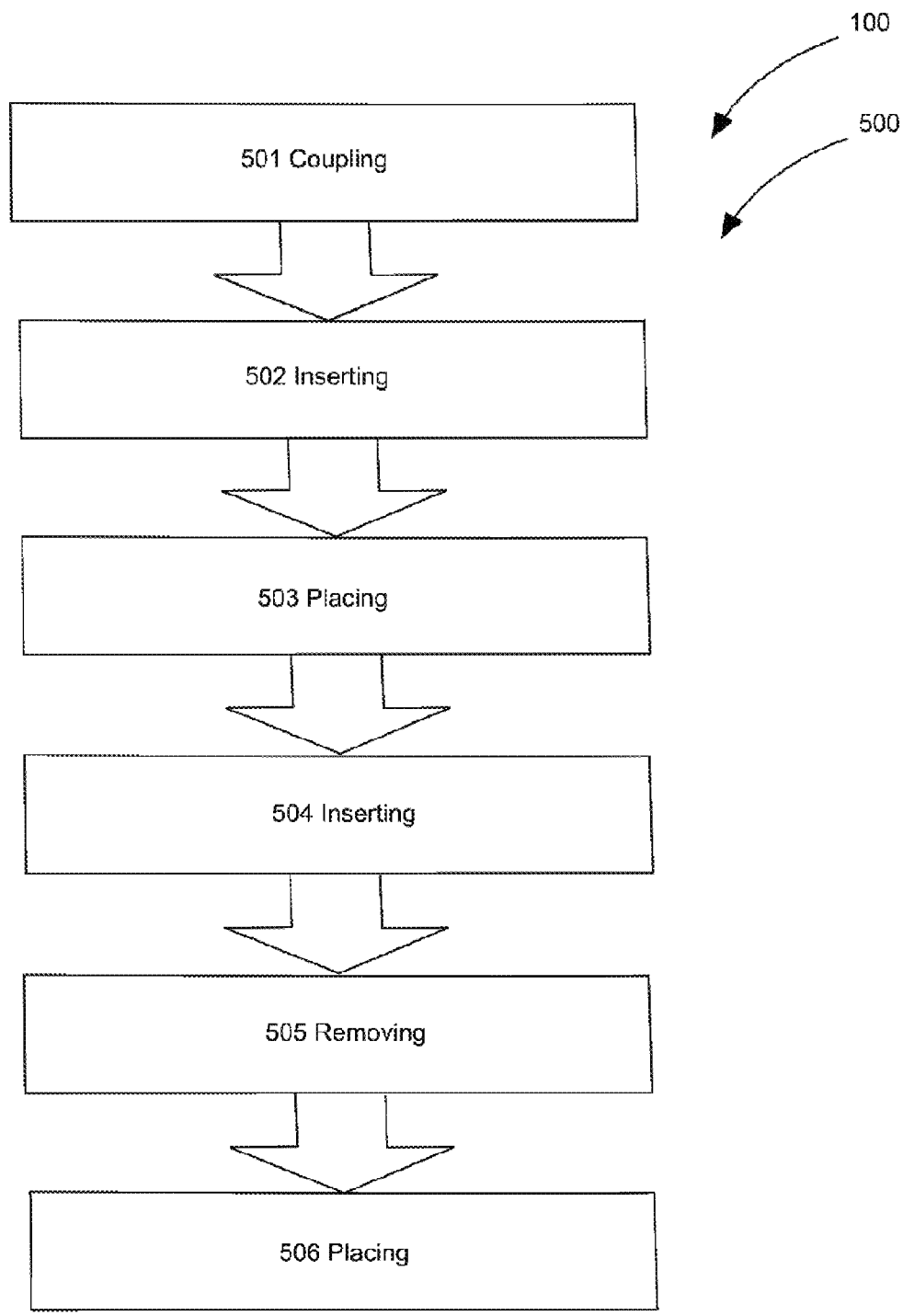
FIG. 5 is a flowchart illustrating a method of use for an easy grilling skewer preparation system according to an embodiment of the present invention of FIGS. 1-4.

Referring now to FIG. 5, a flowchart illustrating a method of use 500 for easy grilling skewer preparation system 100 according to an embodiment of the present invention of FIGS. 1-4.

A method of use 500 for easy grilling skewer preparation system 100 may comprise the steps of: step one 501 coupling plurality of horizontal-dividers 130 and plurality of vertical-dividers 140 via plurality of horizontal-divider-intersection-slots 136 on plurality of horizontal-dividers 130 and plurality of vertical-divider-intersection-slots 145 on vertical-dividers 140; step two 502 inserting coupled plurality of horizontal-dividers 130 and plurality of vertical-dividers 140 into preparation-tray 120; step three 503 placing food-items 150 into plurality of food-item-cubes 155 as desired; step four 504 inserting each of plurality of skewers 170 through each of corresponding plurality of skewer-slots 172 on first-side 124 through each of food-items 150 located in food-item-cubes 155, through skewer-slots 170 on horizontal-dividers 130, and through opposite aligned skewer-slot 172 on third-side 128; step five 505 removing each of plurality of skewers from preparation-tray 120 by lifting each of plurality of skewers 170 from an open-top of preparation-tray 120; and step six 506 placing plurality of skewers 170 on a grill for cooking.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A grilling skewer preparation system comprising:
   a skewer-preparation-assembly comprising;
      a preparation-tray having a bottom-surface, a first-side, a second-side, a third-side, and a fourth-side;
      a first set of horizontal-dividers, each horizontal-divider of said first set of horizontal-dividers having a horizontal-first-end, a horizontal-second-end, a plurality of skewer-slots, and a plurality of horizontal-divider-intersection-slots; and
      a second set of horizontal-dividers, each horizontal-divider of said second set of horizontal-dividers having a horizontal-first-end, a horizontal-second-end, and a plurality of horizontal-divider-intersection-slots; and
   a plurality of skewers;
   wherein said first-side, said second-side, said third-side, and said fourth-side are fixedly attached to outer-edges of said bottom-surface;
   wherein said first-side and said third-side each comprise a plurality of skewer-slots;
   wherein each of said first set and second set of horizontal-dividers comprise a plurality of horizontal-divider-intersection-slots extending from a top-edge of each of said horizontal-dividers;
   wherein each of said first set and second set of horizontal-dividers comprise a plurality of skewer-slots extending from a top-edge of each of said horizontal-dividers;
   wherein each of said first set and second set of horizontal-dividers are placed into said preparation-tray via coupling each of said first set of horizontal-dividers intersection-slots with each of said second set of horizontal-dividers intersection slots creating a plurality of food-item-cubes, each of said food-item-cubes able to hold a food-item;
   wherein a user is able to assemble said skewer-preparation-assembly via coupling said first set of horizontal-dividers and said second set of horizontal-dividers via their respective intersection slots and place joined said first set of horizontal-dividers and said second set of horizontal-dividers into said preparation-tray;
   wherein said user is able to place said food-items into said food-item-cubes and insert said plurality of said skewers through respective ones of each of said plurality of skewer-slots on said first-side, through each of said food-items, through each of said skewer-slots on said horizontal-dividers, and through each of opposing said plurality of skewer-slots on said third-side.

2. The grilling skewer preparation system of claim 1 wherein said preparation-tray comprises a rectangular shape approximately 15 inches long, approximately 9 inches wide and approximately 1½ inches deep, able to contain a plurality of said skewers holding said food-items.

3. The grilling skewer preparation system of claim 2 wherein said first-side, said second-side, said third-side, and said fourth-side are molded together in said rectangular shape and fixedly molded to said outer-edges of said bottom-surface.

4. The grilling skewer preparation system of claim 3 wherein said preparation-tray comprises machine washable plastic material.

5. The grilling skewer preparation system of claim 1 wherein said plurality of skewer-slots on said first-side, said third-side, and said first set of horizontal-dividers extend approximately ¾ inch from said top-edge of said first-side and said third-side and said horizontal-dividers.

6. The grilling skewer preparation system of claim 1 wherein each of said first set of horizontal-dividers comprise a support-tab on said horizontal-first-end and said horizontal-second-end, said support-tabs providing stability for each of said first set of horizontal-dividers positioned on said preparation-tray.

7. The grilling skewer preparation system of claim 6 wherein each of said support-tabs on said horizontal-first-end rest on said top-edge of said second-side and each of said support-tabs on said horizontal-second-end rest on said top-edge of said fourth-side.

8. The grilling skewer preparation system of claim 6 wherein each of said first set of horizontal-divider-intersection-slots comprise a length of approximately ¾ inches extending from said top-edge thereof.

9. The grilling skewer preparation system of claim 1 wherein each of said second set of horizontal-dividers comprise support-tabs on said horizontal-first-end and said horizontal-second-end, said support-tabs providing stability for each of said horizontal-dividers on said preparation-tray.

10. The grilling skewer preparation system of claim 9 wherein each of said support-tabs on said horizontal-first-end rest on said top-edge of said first-side and each of said support-tabs on said horizontal-second-end rest on said top-edge of said third-side.

11. The grilling skewer preparation system of claim 9 wherein each of said plurality of horizontal-divider-intersection-slots on said plurality of horizontal-dividers comprise a length of approximately ¾ inches extending from said bottom-edge of said plurality of horizontal-dividers.

12. The grilling skewer preparation system of claim 1 wherein each of said plurality of skewers are of sufficient length to enter each of said plurality of skewer-slots on said first-side through each of said food-items and through said plurality of skewer-slots on said third-side.

13. The grilling skewer preparation system of claim 12 wherein each of said plurality of skewers comprises a ringed-handle able to be gripped by said user to handle each of said plurality of skewers.

14. The grilling skewer preparation system of claim 12 wherein each of said plurality of skewers comprises a sharp-tip, said sharp-tip able to penetrate through said food-items.

15. The grilling skewer preparation system of claim 14 wherein said food-items comprise pieces of meat sized to fit into said food-item-cubes.

16. The grilling skewer preparation system of claim 15 wherein said food-items comprise vegetables sized to fit into said food-item-cubes.

17. The grilling skewer preparation system of claim 15 wherein each of said food-item-cubes comprises said length, said width, and said depth of approximately 1½ inches, each of said food-item-cubes able to hold one of said food-items.

\* \* \* \* \*